S. H. Warner,
Sewer.
No. 109,474. Patented Nov. 22, 1870.
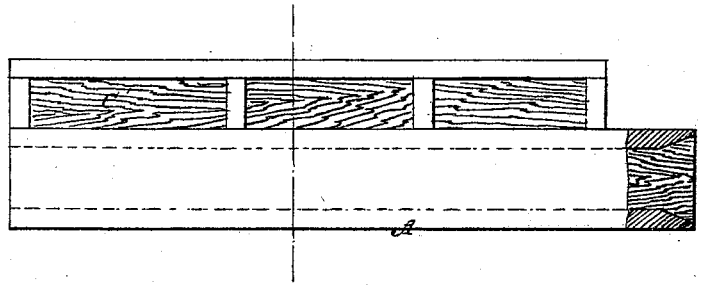
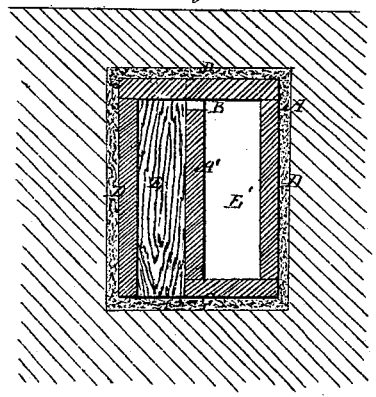
Witnesses:
Chas. N__
Geo. W. Mabee
Inventor:
Saml H. Warner
per Munn & Co
Attorneys.

UNITED STATES PATENT OFFICE

SAMUEL H. WARNER, OF DARBYVILLE, OHIO.

IMPROVEMENT IN UNDERGROUND DRAINS.

Specification forming part of Letters Patent No. 109,474, dated November 22, 1870.

*To all whom it may concern:*

Be it known that I, SAMUEL H. WARNER, of Darbyville, in the county of Pickaway and State of Ohio, have invented a new and Improved Underground Drain; and I do hereby declare that the following is a full, clear, and exact description thereof, which will enable others skilled in the art to make and use the same, reference being had to the accompanying drawing, forming part of this specification.

The purpose of my invention is to make an improvement in underground drains, by which the mud and sediment may be prevented from passing to the bottom and choking the drain.

I will first describe my invention in connection with all that is necessary to a full understanding thereof, and then clearly point it out in the claim.

Figure 1 is a plan of the bottom of one section of my improved drain, and Fig. 2 is a transverse section of the same.

Similar letters of reference indicate corresponding parts.

A is a suitable drain, made of boards or plank, preferably in rectangular form, and divided vertically about the center by a dividing-wall, A', which does not extend quite up to the under side of the top, where there is a space, B, leading from the space E into the space E'.

The space E is open at the bottom for the purpose of causing the water to rise up and pass over A' into space E, the object being to cause the water to stand in the space E long enough for the mud to settle, so that it will not flow with the water onto the bottom of space E', and be deposited there and choke up the space. This is laid on a layer of sand, c, placed on the bottom of the ditch, and the sides and top are also covered with sand, as shown at D, as a means of filtering the water and separating the mud as much as possible before it enters the space E.

By these improvements the drain will be prevented from choking up with mud, as they do now.

I also propose, as a further means of preventing the mud from settling on the bottom, to cover it with glass, which is so smooth that the mud will not adhere to it, as it does to the wood, and it causes the current to be so much stronger that what mud does flow up onto it with the water will be carried away.

Having thus described my invention, I claim as new and desire to secure by Letters Patent—

In underground drains, the chamber E', open at B, and chamber E, open at the bottom, combined as and for the purpose described.

SAMUEL H. WARNER.

Witnesses:
 JASON CASE,
 A. T. WALLING.